Dec. 27, 1960     G. W. LANG     2,965,949
MACHINES FOR FORMING AND COATING ROOFING TILES
Filed Oct. 7, 1957     5 Sheets-Sheet 1
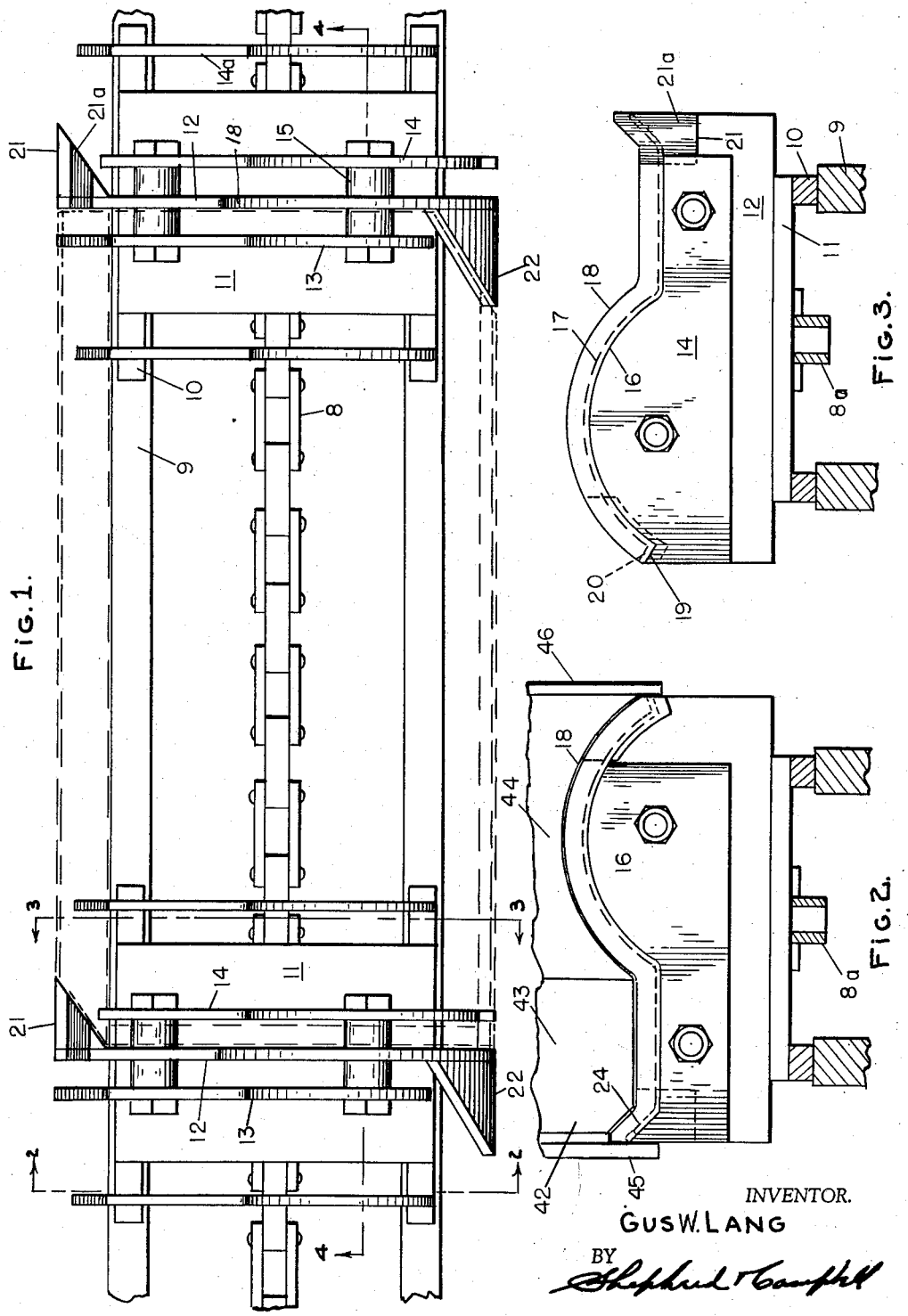
INVENTOR.
GUS W. LANG Dec. 27, 1960 G. W. LANG 2,965,949
MACHINES FOR FORMING AND COATING ROOFING TILES
Filed Oct. 7, 1957 5 Sheets-Sheet 2
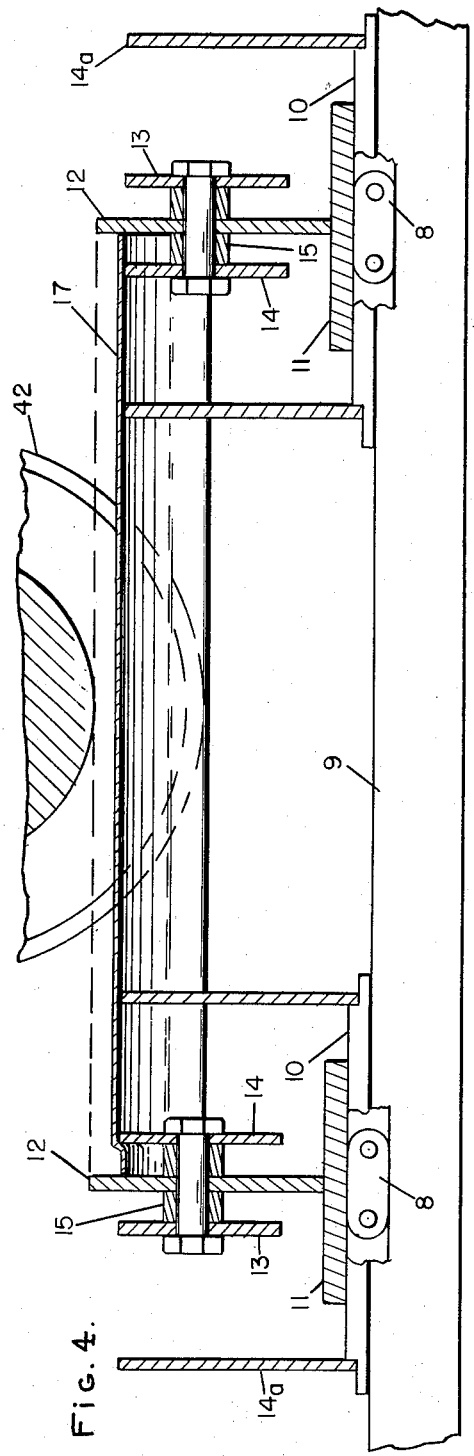
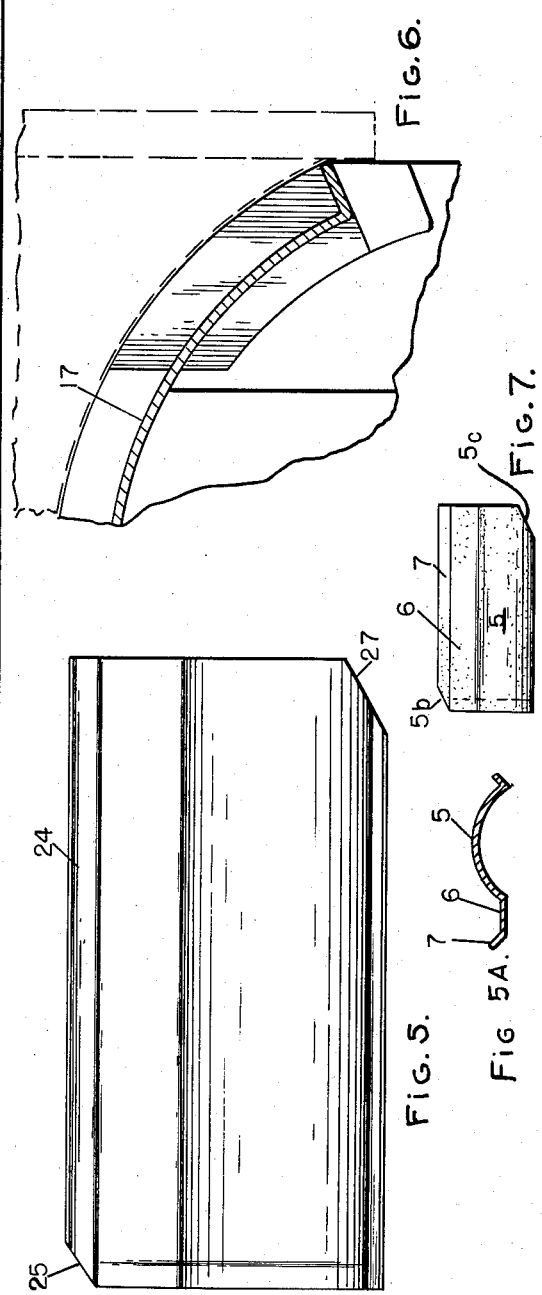
INVENTOR.
GUS W. LANG Dec. 27, 1960   G. W. LANG   2,965,949
MACHINES FOR FORMING AND COATING ROOFING TILES
Filed Oct. 7, 1957   5 Sheets-Sheet 3
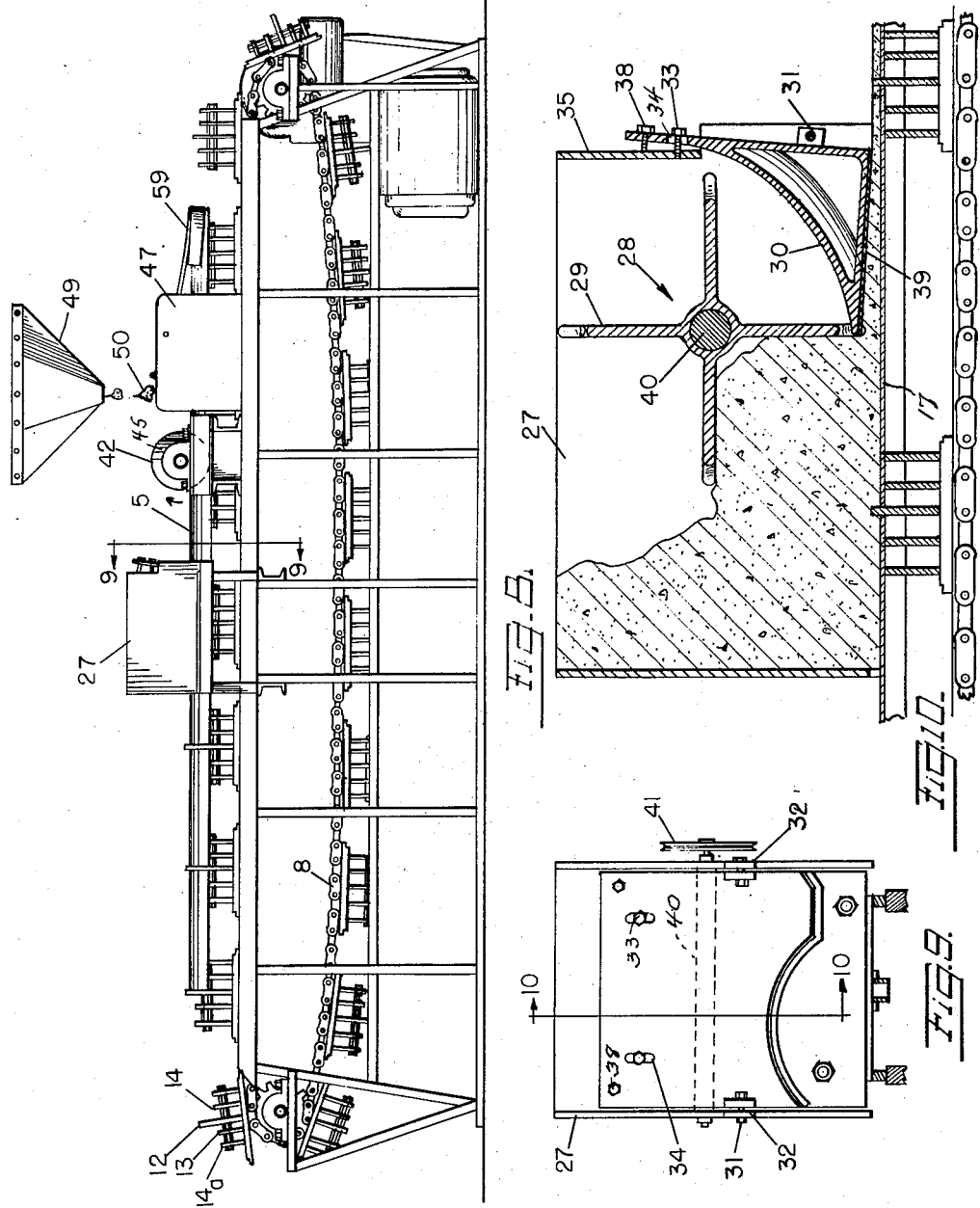
INVENTOR.
GUS W. LANG
BY Dec. 27, 1960 G. W. LANG 2,965,949
MACHINES FOR FORMING AND COATING ROOFING TILES
Filed Oct. 7, 1957 5 Sheets-Sheet 4

INVENTOR.
GUS W. LANG
BY Shepherd & Campbell

Dec. 27, 1960 G. W. LANG 2,965,949
MACHINES FOR FORMING AND COATING ROOFING TILES
Filed Oct. 7, 1957 5 Sheets-Sheet 5
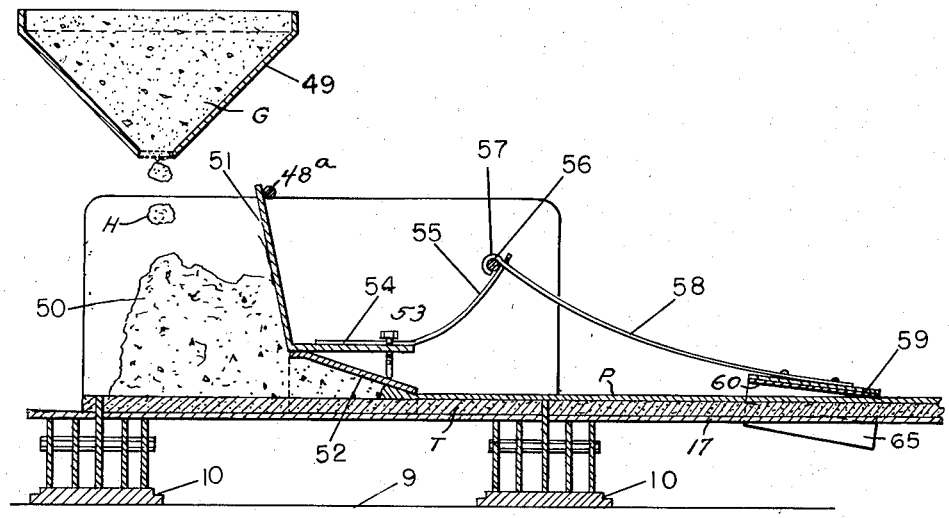
_Fig.14._
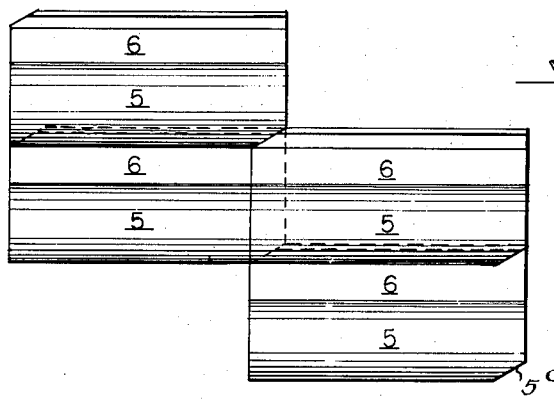
_Fig.16._
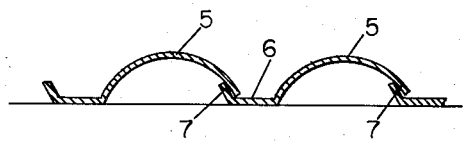
_Fig.15._
INVENTOR.
GUS W. LANG
BY
Shepherd Campbell

United States Patent Office 2,965,949
Patented Dec. 27, 1960

2,965,949

MACHINES FOR FORMING AND COATING ROOFING TILES

Gus W. Lang, Miami, Fla.

Filed Oct. 7, 1957, Ser. No. 688,484

2 Claims. (Cl. 25—43)

This invention relates to means for manufacturing cement roofing tile.

The primary object of the invention is to produce so-called Spanish type tile of a superior quality and construction, said tile having a hard, dense coating, upon the exposed portions thereof.

The invention further relates to the new type of tile manufactured under my invention.

The machine of this invention is of the general nature of that shown in my U.S. Patent 2,531,574. As shown in that patent, as well as many others, it is now common practice to provide machines in which travelling conveyer chains carry pallet carriers and pallets, first beneath a hopper from whence the cementitious material is deposited upon the pallets, then beneath one or more rollers, and finally beneath a means for depositing a white coating upon the upper face of the formed tile.

The respects in which the present invention differs from the foregoing general idea will be best understood by reference to the accompanying drawings, wherein Fig. 1 is a plan view of a portion of a conveyer chain and novel pallet carriers mounted thereon.

Fig. 2 is a transverse sectional view upon line 2—2 of Fig. 1.

Fig. 3 is a transverse sectional view upon line 3—3 of Fig. 1.

Fig. 4 is a fragmentary longitudinal view showing a pallet and its supports and a compressing and forming roller, hereinafter described.

Fig. 5 is a plan view and Fig. 5A a transverse sectional view of one of the pallets.

Fig. 6 is an enlarged, transverse sectional view through that edge of a pallet which lies at the terminal edge of the convex portion of a tile being formed, as hereinafter described, and Fig. 7 is a plan view of a complete tile.

Fig. 8 is a side view of a portion of a tile making machine showing the relation of hopper, roller and troweling mechanism.

Fig. 9 is an outside face view of the discharge side of the hopper.

Fig. 10 is a longitudinal sectional view through the hopper, upon line 10—10 of Fig. 9.

Figs. 12, 13 and 14 are, respectively, a perspective, plan and longitudinal sectional view of the troweling mechanism, hereinafter described.

Fig. 15 is a transverse sectional view through two of the tiles, showing how they interengage when laid upon a roof; and Fig. 16 is a plan view showing how the tiles overlap and engage when laid upon a roof.

Like numerals designate corresponding parts in all of the figures of the drawings.

Figure 11:
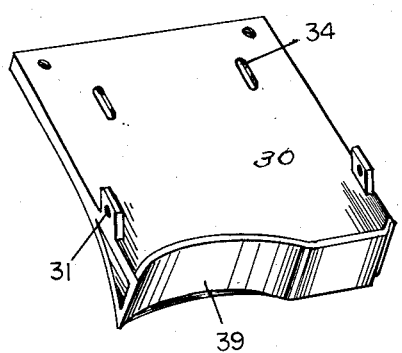
Fig. 11 is a perspective view of the packer head, hereinafter described.

By referring to Figs. 15 and 16 it will be seen that the tiles to be formed comprise bowed, convex portions 5, flat valley portions 6, and upturned inclined edge flange portions 7, over which the terminal outside edge of the bowed portion of an adjacent tile engages. These so-called Spanish S type tiles, comprising, as they do, relatively wide valley portions and alternating bowed portions, present a very attractive appearance when laid upon a roof and consequently are very popular. However, the fact that these tiles present, at least in part, surfaces which are convex, introduces certain difficulties in troweling plastic white coatings upon them, to a degree which brings about a distinctive coactive relation between the packing means in the hopper and the subsequent troweling steps, as will be hereinafter explained.

Referring now to Figs. 1 to 6, 8 designates a conventional conveyer chain which is mounted to travel upon trackways 9 (Figs. 2 and 3) through shoes 10, in the manner described in my Patent 2,531,574. The shoes are carried by plates 11, to which some of the link elements 8a of chain 8 are attached.

Each plate 11 carries three upstanding plate-like elements, the center ones 12 of which are pallet separating elements and the other two 13 and 14 of which are pallet supporting elements, the latter two being spaced from the center elements by spacing sleeves 15 (Fig. 1). Additional upright plates 14a (Fig. 14) may be employed to further support the pallets. The upper edges 16 of the pallet supports are shaped to conform to the shape of the under side of the pallets 17, while the upper edges 18 of the central, pallet separating elements, are shaped to conform to the shape of and lie in the plane of the upper face of the finished tile.

The left-hand edge of element 14 in Fig. 3 is shaped to form a shoulder 19, against which an outstanding flange 20 of the pallet abuts. This flange 20 defines and forms the terminal edge of the convex portion of the tile. Each pallet separating element carries two triangular blocks, one of which, 21 (Fig. 1), projects toward element 14 and the other of which, 22, projects toward element 13. Block 21 has its upper face shaped to conform to the shape of the top edge of separator plate 12 against which the cut out corners of the tiles abut and which blocks project to the top of the finished tile, whereby to produce cut away corners on the tiles. Block 21 also has a vertical face, 21a, with which the cut away corner 25 of the pallet of Fig. 5 abuts. Block 21 rises to the top of the finished tile Fig. 3 and therefore the presence of this block and the complete cutting off of the corner of the pallet, results in the formation of a tile having its corner cut away upon a bevel as at 5b in Figs. 7 and 16. In like manner the other of said blocks 22 coacts with a cut away corner 27 of the pallets at the diagonally opposite end of the pallet to provide a similar cut away corner 5c at the corner of the concave portion of the tile. In other words, blocks 21 and 22 constitute filler blocks. When the tiles are laid upon a roof their ends overlap to the extent indicated in dotted lines in Fig. 16. Thus the convex portions of the tiles are kept in longitudinal alignment and the beveled corners mate, as shown in said figure.

As the pallets are carried along by the chain they pass through the lower portion of the hopper. This hopper is supported by legs 27a from the frame F of the machine. A packing and troweling mechanism constituting the closure for the discharge end of the hopper comprises a rotative agitating and packing wheel 28, the paddle-like spokes 29 of which are shaped at their ends to conform to the shape of the inner side of a packing head 30 (Figs. 8 and 11). This packing and troweling head carries ears 31 which are pivotally engaged with corresponding ears 32 of the hopper. Retaining screws 33 hold the packer head in place by being passed through slots 34 of the head and engaging the end wall 35 of the hopper. Adjusting screws 38 thrust against wall 35 and determine the pressure which will be exerted upon the cementitious material at the time of its exit from the hopper. The underface of the packer head, which may include a renewable wear plate 39, is shaped to conform to the shape of the tile being formed (see Fig. 11). It will be noted that the rear end of the underface of the head is tilted upwardly (Fig. 8), so that the space into which the cementitious material is packed by packing wheel 28 is a forwardly convergent one. The paddles of wheel 28 are upon a shaft 40. A pulley 41 upon said shaft is grooved for the reception of a belt, not shown, which may be driven from any suitable moving part of the machine.

The described step of forcibly packing the tile material upon the pallets at a time when the material is still in the hopper and is consequently confined against lateral escape is very important in the manufacture of tiles, the upper faces of which are of convex formation. The reason for this will be presently explained.

After the tiles leave the hopper they are passed beneath a trimming and sizing roller 42. This roller has portions which conform to the transverse contour of the tiles. It comprises a cylindrical portion 43 conforming to the valley portion of the tile, a concave portion 44 conforming to the convex portion of the tile and end flanges 45 and 46, between which the edge portions of the pallets snugly pass.

Up to this point the material being packed upon the pallets is a mixture of sand, cement, and a small amount of water, which, if permitted to dry and harden would present a dirty grey appearance. In my prior patent a coating of white cement was sifted upon the upper faces of the tiles. In my application, Serial Number 637,666, filed on the first day of February, 1957, which matured as Patent No. 2,946,110, there is disclosed a troweling mechanism for troweling a thin paste of a coating of pure white material of a putty-like consistency upon tiles, by which the upper faces of the tiles are brought to a condition of pristine whiteness. However, the troweling mechanism shown in said application is of a nature to coat flat tile only.

Figure 12:
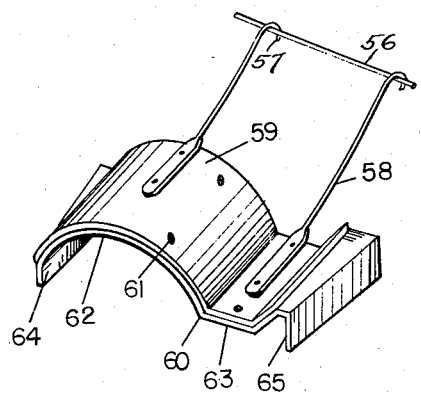
Figure 13:
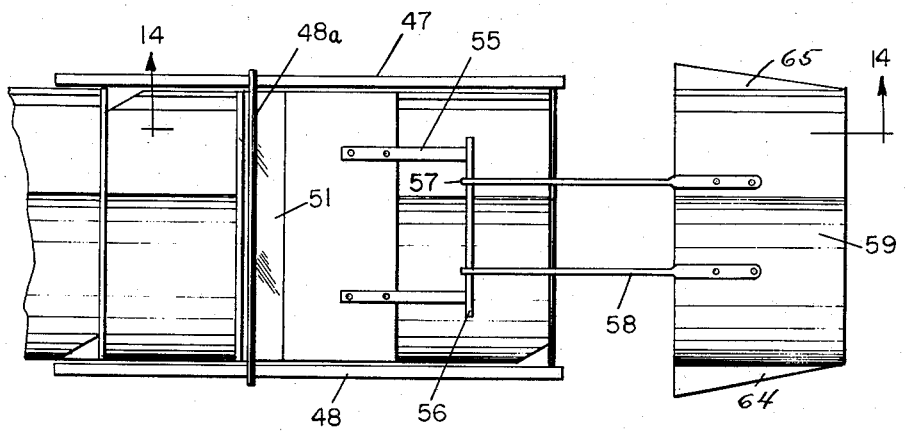

In Figures 12 to 14 I have shown a troweling mechanism adapted to apply a paste coating of coloring material preferably but not necessarily white, upon tiles of any cross sectional shape, at least part of the upper face thereof being of bowed convex formation.

The reason that the forcible packing of the material as it leaves the hopper is of such importance is that while gravity holds the still wet, tile forming material upon the pallets when flat tiles are being troweled with a white coating, the same gravitational force tends to dislodge such material from the side faces of convex tiles. The additional packing as described enables me to successfully trowel convex tiles without danger of dislodgment of the material. Further, the smoothing on to the convex surface, of a coating of thin putty consistency, aids in binding the surface of the tile and helps to hold the material from dislodgement from the pallet until the tile has hardened enough to be removed from the pallet.

After the tiles leave the roller they pass between upstanding fixed plates 47 and 48, (Fig. 14). Here the paste G of the consistency of a thin putty drops in large globules H from a hopper 49. Said paste banks up in a mass 50 upon the upper face of the still wet tile material T and against the upstanding member 51 of an L-shaped barrier. This barrier is supported by a rod 48a the ends of which rest upon the upper edges of plates 47, 48. A coarse troweling spring plate 52, the tension of which may be adjusted by screws 53, bears upon the upper faces of the moving tiles to deposit a thin coating of paste P thereon, it being understood that the under faces of the horizontal member 54 of the barrier and also the spring plate, closely conform to the shape of the tiles moving thereunder. A pair of horn-like bars 55 project forwardly and upwardly from member 54. These bars support a transverse rod 56. Hooked ends 57 of bars 58 engage over the rod and floatingly support a light weight finishing trowel element. This element comprises a top plate 59 to which bars 58 are affixed and a trowel 60 that is removably secured to top plate 59 by screws 61 or by any other suitable means. This renders it possible to replace trowel 60 when it becomes worn, without discarding the top plate and its supporting bars. The trowel 60 is shaped as shown in Fig. 12 to provide a concave portion 62, which trowels the convex portion of the tile, a flat portion 63 which trowels the valley portion of the tiles and downturned wings 64 and 65 which trowel the edge portions of the tiles. These downturned wings flare outwardly toward their rear ends, so that paste disposed along the sides of the tiles will travel into converging channels, whereby the final troweling action will be to press the paste firmly against the sides and edges of the tiles.

It is to be understood that the invention is not limited to the particular construction shown because other forms of packers may be devised for use in lieu of the one shown at the discharge end of the hopper. The important thing is to impart such a final and powerful squeeze to the cement mix at that point as will cause the mix to adhere firmly to the convex surfaces of the pallets, under the final troweling action. Roller 42 is merely a trimming roller the end flanges of which trim off and discard any surplus cement mix or "mud" as it is known in the industry. This roller rotates in the direction indicated by the arrow and does not bear upon the finished portion of the tile with such force as would be likely to dislodge the cement mix from the downwardly curved sides of the pallet. Any conventional means such as is shown in my Patent No. 2,531,574 may be used for driving roller 42. The driving pulley 41 of packing wheel could be driven by a crossed belt from the shaft of roller 42 or otherwise. The invention is in the packing and troweling combination in this otherwise old type of machine.

Thus the invention includes within its purview whatever changes fairly fall within either the terms or the spirit of the appended claims.

I claim:

1. A machine for making cement roofing tiles having convex upper faces, and for depositing a paste-like coating coating upon said convex upper faces in a continuing operation in which the paste-like coating is applied to the cement of the tiles before said cement has hardened, said machine comprising a hopper for the cement mix, a traveling conveyer passing beneath said hopper, pallets supported and conducted by the conveyer through the hopper where they are filled with the cement mix, said pallets having the major portions of their upper faces in the form of convex arcs, a packing head disposed at the exit from the hopper which head has an underface shape to conform to the shape of the upper faces of the pallets, said packing head acting to exert a compressive and packing action of the cement mix upon the concave upper faces of the pallets as they are carried by the conveyer away from the hopper, a rough traveling barrier spanning of the path of travel of the tiles, said barrier comprising means for supplying and feeding a putty-like plastic coating material directly upon the upper faces of the still wet cement tiles, and behind said barrier, said barrier having an under face conforming to the shape of the convex upper faces of the tiles, and a finishing travel element having its under face shaped to closely conform to the upper faces of the finished tiles and comprising members shaped to squeeze the coating material toward and upon the still wet convex faces of the tiles.

2. The combination with a conventional cement tile forming machine of the character comprising a traveling conveyer, a plurality of pallets carried by said conveyer having arcuate convex upper faces adapted to form tiles, a substantial portion of the upper faces of which are of convex formation, and a hopper for the cement mix through which the said pallets are carried by the conveyer, of a rotative packer within the hopper acting to thrust the cement mix forcibly toward the exit point of the pallets from the hopper and to forcibly impact the cement mix upon the convex faces of the pallets as they leave the hopper, a troweling device disposed above and spanning the path of the conveyer and the newly formed tiles, said troweling device comprising a barrier element having a troweling under-face shaped to conform to the shape of the convex upper-face portions of the tiles, and a transverse upstanding member, a hopper constructed and located to deliver a coating composition of a paste or putty-like consistency upon the surface of the tiles behind said upstanding member, the forcible impacting of the cement mix upon the convex surfaces of the pallets aiding in preventing dislodgement of the mix by gravity from the pallets and the quick application of the paste coating upon the still soft tiles further aiding in holding the mix against dislodgement during the initial hardening of the mix.

References Cited in the file of this patent

UNITED STATES PATENTS

| | | |
|---|---|---|
| 1,377,188 | Domine | May 10, 1921 |
| 1,559,499 | Brandell | Oct. 27, 1925 |
| 1,559,500 | Lidseen | Oct. 27, 1925 |
| 1,750,113 | Martin | Mar. 11, 1930 |
| 2,320,728 | Hume | June 1, 1943 |
| 2,531,574 | Lang | Nov. 28, 1950 |
| 2,641,819 | Peavy | June 16, 1953 |
| 2,683,297 | Lea | July 13, 1954 |
| 2,734,249 | Willis | Feb. 14, 1956 |

FOREIGN PATENTS

| | | |
|---|---|---|
| 126,860 | Australia | Feb. 16, 1948 |
| 22,365 | Denmark | Aug. 7, 1917 |
| 739,860 | Great Britain | Nov. 2, 1955 |

UNITED STATES PATENT OFFICE
CERTIFICATION OF CORRECTION

Patent No. 2,965,949                      December 27, 1960

Gus W. Lang

It is hereby certified that error appears in the above numbered patent requiring correction and that the said Letters Patent should read as corrected below.

Column 4, line 57, for "concave" read -- convex --; line 58, for "traveling" read -- troweling --; same column 4, line 65, for "travel" read -- trowel --.

Signed and sealed this 15th day of August 1961.

(SEAL)
Attest:

ERNEST W. SWIDER                      DAVID L. LADD

Attesting Officer                      Commissioner of Patents